United States Patent
Xiong

(10) Patent No.: US 9,426,851 B1
(45) Date of Patent: Aug. 23, 2016

(54) DIMMABLE LED DRIVER BASED ON SELF-OSCILLATING SOFT-SWITCHING LLC SERIES RESONANT INVERTER TOPOLOGY

(71) Applicant: Universal Lighting Technologies, Inc., Madison, AL (US)

(72) Inventor: Wei Xiong, Madison, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 0 days.

(21) Appl. No.: 14/334,186

(22) Filed: Jul. 17, 2014

Related U.S. Application Data

(60) Provisional application No. 61/856,122, filed on Jul. 19, 2013.

(51) Int. Cl.
| | | |
|---|---|---|
| *H05B 37/02* | (2006.01) | |
| *H05B 33/08* | (2006.01) | |
| *H02M 3/338* | (2006.01) | |

(52) U.S. Cl.
CPC ....... *H05B 33/0815* (2013.01); *H02M 3/3385* (2013.01); *H05B 33/0845* (2013.01); *H05B 37/0209* (2013.01)

(58) Field of Classification Search
CPC .......................... H05B 37/029; B11K 11/248
USPC ....................... 315/201, 36, 171, 179; 363/21
See application file for complete search history.

(56) References Cited

U.S. PATENT DOCUMENTS

| | | | | |
|---|---|---|---|---|
| 6,469,919 | B1* | 10/2002 | Bennett | 363/56.02 |
| 6,791,279 | B1* | 9/2004 | Shearer | H05B 41/2822 315/209 R |
| 7,417,382 | B2* | 8/2008 | Lin | 315/225 |
| 8,427,064 | B2* | 4/2013 | Zhang | 315/247 |
| 2011/0254461 | A1* | 10/2011 | Summerland et al. | 315/291 |
| 2013/0127358 | A1* | 5/2013 | Yao | 315/201 |

* cited by examiner

*Primary Examiner* — Dylan White

(74) *Attorney, Agent, or Firm* — Patterson Intellectual Property Law, P.C.; Mark J. Patterson

(57) ABSTRACT

A driver circuit (e.g., an LED driver circuit) provides power to a load (e.g. an LED light source) from a DC power rail. A self-oscillating LLC series resonant inverter is configured to connect to the DC power rail, receive DC power from the DC power rail, and provide an AC output signal. A current limiting circuit is connected to the self-oscillating LLC series resonant inverter. The current limiting circuit receives the AC output signal from the self-oscillating LLC series resonant inverter and provides an AC current signal as a function of the DC current provided to the load by the driver circuit. The rectifier circuit receives the AC current signal from the current limiting circuit and provides a DC current to the load.

16 Claims, 1 Drawing Sheet

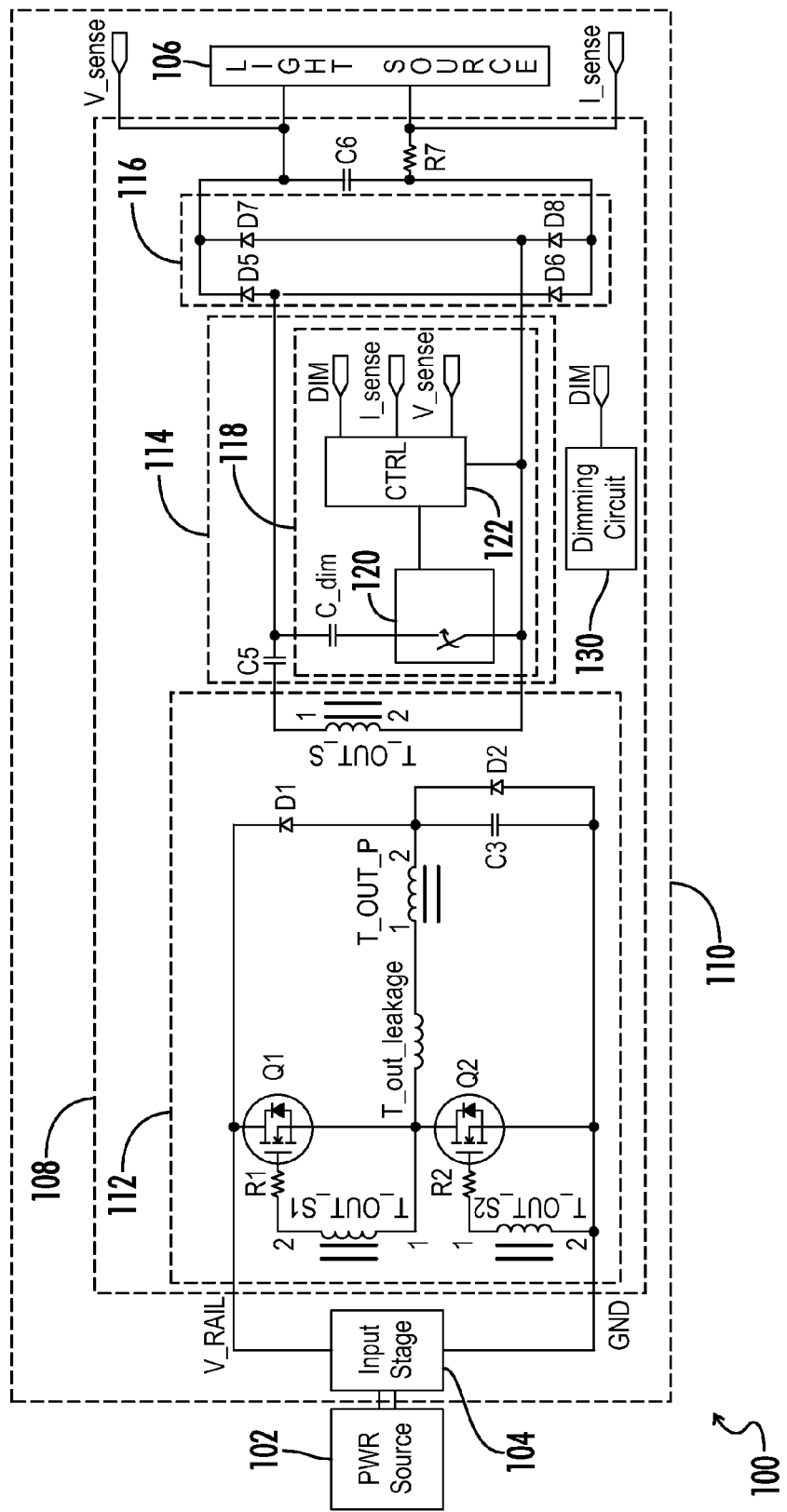

DIMMABLE LED DRIVER BASED ON SELF-OSCILLATING SOFT-SWITCHING LLC SERIES RESONANT INVERTER TOPOLOGY

CROSS-REFERENCES TO RELATED APPLICATIONS

This application claims priority to and hereby incorporates by reference in its entirety U.S. Provisional Patent Application Ser. No. 61/856,122 entitled "DIMMABLE LED DRIVER BASED ON SELF-OSCILLATING ALL TIME SOFT-SWITCHING LLC SERIES RESONANT INVERTER TOPOLOGY" filed on Jul. 19, 2013.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to direct current (DC) constant current driver circuits. More particularly, this invention pertains to voltage and current limited constant current DC driver circuits.

Light emitting diodes (LEDs) provide light in response to receiving a DC current (assuming proper bias) and in proportion to the received DC current. Resistance of an LED light source fluctuates. Therefore, constant current driver circuits are preferred with LED based light sources. Underwriters Laboratories (UL) class II standards for LED driver circuits require that the driver circuit have an isolated output, pass a short circuit test, provide a controlled (i.e., limited) output voltage, and provide a constant current. Generally, UL class II LED driver circuits are also dimmable. That is, the magnitude of the constant output current may be varied by the driver circuit to match a target current, thereby matching a target brightness output level for the LED light source.

BRIEF SUMMARY OF THE INVENTION

Aspects of the present invention provide a voltage and current limited, constant current DC driver circuit. The driver circuit is based on a self-oscillating LLC series resonant inverter and includes additional alternating current (AC) current limiting circuitry to regulate output current from the self-oscillating LLC series resonant inverter to the load or light source.

In one aspect, a driver circuit provides power to a load from a DC power rail. The driver circuit includes a self-oscillating LLC series resonant inverter, a current limiting circuit, and a rectifier circuit. The self-oscillating LLC series resonant inverter is configured to connect to the DC power rail, receive DC power from the DC power rail, and provide an alternating current (AC) output signal. The current limiting circuit is connected to the self-oscillating LLC series resonant inverter. The current limiting circuit is configured to receive the AC output signal from the self-oscillating LLC series resonant inverter and provide an AC current signal as a function of the DC current provided to the load by the driver circuit. The rectifier circuit is connected to the current limiting circuit. The rectifier circuit receives the AC current signal from the current limiting circuit and provides the DC current to the load.

In another aspect, a light fixture receives power from a power source and provides illumination. The light fixture includes an input stage, a light source, a driver circuit, and a housing. The input stage receives power from the power source and provides a DC power rail. The DC power rail has a substantially constant DC voltage. The light source emits light in response to receiving power. The driver circuit provides power to the light source from the DC power rail. The housing supports the input stage, the light source, and the driver circuit. The driver circuit includes a self-oscillating LLC series resonant inverter, a current limiting circuit, and a rectifier circuit. The self-oscillating LLC series resonant converter is connected to the DC power rail. The self-oscillating LLC series resonant inverter is configured to receive DC power from the DC power rail and provide an AC output signal. The current limiting circuit is connected to the self-oscillating LLC series resonant inverter. The current limiting circuit is configured to receive the AC output signal from the self-oscillating LLC series resonant inverter and provide an AC current signal as a function of the DC current provided to the light source by the driver circuit. The rectifier circuit is connected to the current limiting circuit. The rectifier circuit receives the AC current signal from the current limiting circuit and provides the DC current light source.

BRIEF DESCRIPTION OF THE SEVERAL VIEWS OF THE DRAWINGS

FIG. 1 is a block and partial schematic diagram of an embodiment of a light fixture including a driver circuit based on a self-oscillating LLC series resonant inverter in accordance with the present invention.

Reference will now be made in detail to optional embodiments of the invention, examples of which are illustrated in accompanying drawings. Whenever possible, the same reference numbers are used in the drawing and in the description referring to the same or like parts.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

The phrase "in one embodiment," as used herein does not necessarily refer to the same embodiment, although it may. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The terms "coupled" and "connected" mean at least either a direct electrical connection between the connected items or an indirect connection through one or more passive or active intermediary devices.

The term "circuit" means at least either a single component or a multiplicity of components, either active and/or passive, that are coupled together to provide a desired function.

The terms "switching element" and "switch" may be used interchangeably and may refer herein to at least: a variety of transistors as known in the art (including but not limited to FET, BJT, IGBT, JFET, etc.), a switching diode, a silicon controlled rectifier circuit (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

As used herein, "ballast" and "driver circuit" refer to any circuit for providing power (e.g., current) from a power source to a light source. Additionally, "light source" refers to one or more light emitting devices such as fluorescent lamps, high intensity discharge lamps, incandescent bulbs, and solid state light-emitting elements such as light emitting diodes (LEDs), organic light emitting diodes (OLEDs), and plasmaloids.

In one embodiment, a voltage limited constant current driver circuit is based on a self-oscillating LLC series resonant inverter topology. A pair of clamping diodes limits the voltage across the resonant capacitor to a rail voltage provided at the self-oscillating LLC series resonant oscillator such that the self-oscillating LLC series resonant inverter provides a constant alternating current (AC) voltage output (i.e. voltage limited output). A current limiting capacitor and a rectifier circuit convert the constant voltage AC output from the self-oscillating LLC series resonant inverter into a direct current (DC) output having a constant current. An optional output current regulator may be used to reduce AC current provided from the current limiting capacitor to the rectifier circuit and therefore the magnitude of the constant DC current provided to a load (e.g., light source) driven by the driver circuit. The self-oscillating LLC series resonant inverter inherently provides an isolated output via a transformer integral to its topology.

Referring to FIG. 1, a light fixture 100 receives power from a power source 102 and provides illumination. The light fixture 100 includes an input stage 104, a light source 106, a driver circuit 108, and a housing 110. The housing 110 is supports the input stage 104, the light source 106, and the driver circuit 108. The light source 106 provides illumination in response to receiving power. The power source 102 may be, for example, alternating current (AC) line power (e.g., a power line at 120V AC, 60 Hertz). The input stage 104 receives power from the power source 102 and provides a direct current (DC) power rail V_RAIL. In one embodiment, the input stage 104 is a power factor correcting AC-to-DC converter. In another embodiment, when the power source 102 is a DC power source, the input stage 104 may be a DC regulator and/or DC-to-DC converter. The driver circuit 108 provides power to the light source 106 from the DC power rail V_RAIL. In one embodiment, the light source 106 includes at least one light emitting diode (LED), and may include a plurality of light emitting diodes connected in series and/or parallel. Although described herein in the context of a light fixture, it is contemplated that the driver circuit 108 may be used to drive loads other than light sources.

The driver circuit 108 includes a self-oscillating LLC series resonant inverter 112, a current limiting circuit 114, and a rectifier circuit 116. The driver circuit 108 may also include an output capacitor C6 connected in parallel with the light source 106. The self-oscillating LLC series resonant inverter 112 is connected to the DC power rail V_RAIL. Self-oscillating LLC series resonant inverter 112 is configured to receive DC power from the DC power rail V_RAIL and provide an AC output signal. In one embodiment, the DC power rail V_RAIL has an associated ground GND and the self-oscillating LLC series resonant inverter 112 includes a first switch Q1, a second switch Q2, a resonant capacitor C3, and a transformer T_OUT. The first switch Q1 has a first terminal, a second terminal, and a control terminal. The first terminal of the first switch Q1 is connected to the DC power rail V_RAIL. The second switch Q2 has a first terminal, a second terminal, and a control terminal. The first terminal of the second switch Q2 is connected to the second terminal of the first switch Q1. The second terminal of the second switch Q2 is connected to the ground GND associated with the DC power rail V_RAIL. The resonant capacitor C3 has a first terminal and a second terminal. The first terminal of the resonant capacitor C3 is connected to the ground GND associated with the DC power rail V_RAIL.

The transformer T_OUT has a primary winding T_OUT_P, a first secondary winding T_OUT_S1, a second secondary winding T_OUT_S2, and an output secondary winding T_OUT_S. The primary winding T_OUT_P of the transformer T_OUT is connected between the second terminal of the first switch Q1 and the second terminal of the resonant capacitor C3. The leakage inductance of the primary winding T_OUT_P of the transformer T_OUT acts as the primary inductance in the LLC resonant tank of the self oscillating LLC series resonant inverter 112. The leakage inductance of the primary winding T_OUT_P of the transformer T_OUT is shown in FIG. 1 as a separate inductor from the representation of the primary winding T_OUT_P of the ideal transformer T_OUT, however it is contemplated that the main resonant inductance of the self-oscillating LLC series resonant inverter 112 may be integral with the primary winding T_OUT_P of the transformer T_OUT or embodied in a separate circuit element. The first secondary winding T_OUT_S1 of the transformer T_OUT is connected between the control terminal of the first switch Q1 and the second terminal of the first switch Q1. The second secondary winding T_OUT_S2 of the transformer T_OUT is connected between the control terminal of the second switch Q2 and the second terminal of the second switch Q2. The output secondary winding T_OUT_S of the transformer T_OUT provides the AC output signal.

In one embodiment, the self oscillating LLC series resonant inverter 112 further includes a first drive resistor R1 and a second drive resistor R2. The first drive resistor R1 is connected in series with the first secondary winding T_OUT_S1 of the transformer between the control terminal of the first switch Q1 and the second terminal of the first switch Q1. The second drive resistor R2 is connected in series with the second secondary winding T_OUT_S2 of the transformer T_OUT between the control terminal of the second switch Q2 and the second terminal of the second switch Q2. In one embodiment, the first drive resistor R1 is connected between the first secondary winding T_OUT_S1 of the transformer T_OUT and the control terminal of the first switch Q1, and the second drive resistor R2 is connected between the second secondary winding T_OUT_S2 of the transformer T_OUT and the control terminal of the second switch Q2. In one embodiment, the first switch Q1 and the second switch Q2 are MOSFETs such that the first drive resistor R1 and second drive resistor R2 are gate drive resistors. In another embodiment, the first switch Q1 and the second switch Q2 are bipolar junction transistors such that the first drive resistor R1 and second drive resistor R2 are base drive resistors.

In one embodiment, the self oscillating LLC series resonant inverter 112 further includes a first diode D1 and a second diode D2. The first diode D1 has a cathode connected to the first terminal of the first switch Q1. The second diode D2 has a cathode connected to an anode of the first diode D1 and an anode connected to the ground GND associated with the DC power rail V_RAIL. The first diode D1 and second diode D2 are clamping diodes that prevent the voltage across the resonant capacitor C1 from exceeding the DC rail voltage V_RAIL. Therefore, the first diode D1 and second diode D2 ensure soft switching of the first switch Q1 and second switch Q2 which improves power transfer efficiency and reduces electromagnetic interference or noise. The first diode D1 and second diode D2 further ensure that the peak voltage across the primary winding T_OUT_P of the transformer T_OUT is limited to the DC power rail voltage V_RAIL which results in a generally square wave waveform when the self oscillating LLC series resonant inverter 112 is operating at or near resonant frequency.

The output secondary winding T_OUT_S of the transformer T_OUT is configured to provide the AC output signal of the self-oscillating LLC series resonant inverter 112. In one embodiment, the AC output signal of the self-oscillating LLC series resonant converter 112 is a constant output voltage AC voltage source. Referring to Equation 1, the operating frequency $f_{op}$ of the self-oscillating LLC series resonant inverter 112 is determined as a function of the primary inductance (i.e., the output leakage inductance T_OUT_leakage of the transformer T_OUT and any other series inductance) and the resonant capacitor C3.

$$f_{op} = \frac{1}{2 \cdot \pi \cdot \sqrt{L_{T\_out\_leakage} \cdot C_3}} \quad \text{EQUATION 1}$$

As seen in Equation 2, a voltage of the AC output signal_varies only as a function of the voltage of the DC power rail V_RAIL, where $V_{S\_rms}$ is the voltage of the AC output signal and N is the turns ratio of the transformer T_OUT.

$$V_{s\_rms} = \frac{V_{rail}}{N} \quad \text{EQUATION 2}$$

The current limiting circuit 114 is connected to the self-oscillating LLC series resonant inverter 112. The current limiting circuit 114 is configured to receive the AC output signal from the self-oscillating LLC series resonant inverter 112 (i.e., from the output secondary winding T_OUT_S of the transformer T_OUT) and provide an AC current signal as a function of a DC current provided to the light source 106 by the driver circuit 108. In one embodiment, the driver circuit 108 includes a current sensing resistor R7 connected in series with the light source 106. The current sensing resistor R7 provides a current sensing signal indicative of the DC current provided to the light source 106 by the driver circuit 108. In one embodiment, the current limiting circuit 114 includes a current limiting capacitor C5 and an output current regulator circuit 118. The current limiting capacitor C5 has a first terminal connected to a first terminal of the output secondary winding T_OUT_S of the transformer T_OUT and a second terminal connected to the rectifier circuit 116. As seen in Equation 3, the current limiting capacitor C5 controls the maximum DC current output of the driver circuit 108.

$$I_{out\_DC\_max} = \frac{2 \cdot \sqrt{2}}{\pi} \cdot \frac{\frac{V_{rail}}{N}}{\frac{1}{j \cdot 2 \cdot \pi \cdot f_{op} \cdot C_5}} \quad \text{EQUATION 3}$$

The output current regulator circuit 118 is connected between the second terminal of the current limiting capacitor C5 and the second terminal of the output secondary T_OUT_S of the transformer T_OUT. The output current regulator circuit 118 includes a dimming capacitor C_dim, a bidirectional switch 120, and a controller 122. The dimming capacitor C_dim and the bidirectional switch 120 are connected in series between the second terminal of the current limiting capacitor C5 and the second terminal of the output secondary winding T_OUT_S of the transformer T_OUT. The driver circuit 108 may also include a diming circuit 130 configured to provide a target current signal indicative of a target current. The target current (e.g., the brightness of the light source 106) may be established by manual intervention at the light fixture 100, via an external controller, or via network based control. The controller 122 is configured to provide a pulse width modulated signal to the bidirectional switch 120 (i.e., to a control terminal of the bidirectional switch 120) as a function of the DC current provided to the light source 106 by the driver circuit 108. The controller 122 may also adjust a duty cycle and/or frequency of the pulse width modulated signal as a function of a voltage across the light source 106 and the target current indicated by the target current signal provided by the dimming circuit 130.

As seen in Equation 4, the controller 122 can control the DC output of the driver circuit 108 to maintain the DC output current to the light source 106 near zero for a relatively large value of the dimming capacitor C_dim, where $R_{load}$ is the resistance of the load or light source 106 and $I_{out\_DC\_min}$ is the minimum DC output current.

$$I_{out\_DC\_min} = \frac{2 \cdot \sqrt{2}}{\pi} \cdot \frac{\frac{V_{rail}}{N}}{\frac{1}{j \cdot 2 \cdot \pi \cdot f_{op} \cdot C_5} + \frac{R_{load} \cdot \frac{1}{j \cdot 2 \cdot \pi \cdot f_{op} \cdot C_{dim}}}{\frac{1}{j \cdot 2 \cdot \pi \cdot f_{op} \cdot C_{dim}} + R_{load}}} \cdot \frac{\frac{1}{j \cdot 2 \cdot \pi \cdot f_{op} \cdot C_{dim}}}{\frac{1}{j \cdot 2 \cdot \pi \cdot f_{op} \cdot C_{dim}} + R_{load}}$$

EQUATION 4

As seen in Equation 5, the DC output current of the driver circuit 108 is determined as a function of the duty cycle D of the bidirectional switch 120 as set by the controller 122 wherein $I_{out\_DC}$ is the magnitude of the DC output current.

$$I_{out\_DC} = (1-D) \cdot I_{out\_DC\_max} + D \cdot I_{out\_DC\_min}$$

EQUATION 5

The rectifier circuit 116 is connected between the current limiting circuit 114 and the load (i.e., light source 106). The rectifier circuit 116 receives the AC current signal from the current limiting circuit 114 and provides the DC current to the light source 106. In one embodiment, the rectifier circuit 116 is a full wave rectifier circuit having a first input connected to the second terminal of the dimming capacitor C5 and a second input connected to the second terminal of the output secondary winding T_OUT_S of the transformer T_OUT. The rectifier circuit 116 has a first output connected to the light source 106, and a second output connected to the light source 106 via the current sensing resistor R7. The output capacitor C6 is connected between the first output of the rectifier circuit 116 and the second output of the rectifier circuit 116.

Various components herein are described as having first and second terminals. These descriptions are not necessarily indicative of component polarity or orientation. Orientations shown on the attached drawings by pin number or other marking are indicative of component polarity or orientation of the illustrated embodiment.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein.

Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although embodiments of the present invention have been described in detail, it will be understood by those skilled in the art that various modifications can be made therein without departing from the spirit and scope of the invention as set forth in the appended claims.

A controller, processor, computing device, client computing device or computer, such as described herein, includes at least one or more processors or processing units and a system memory. The controller may also include at least some form of computer readable media. By way of example and not limitation, computer readable media may include computer storage media and communication media. Computer readable storage media may include volatile and nonvolatile, removable and non-removable media implemented in any method or technology that enables storage of information, such as computer readable instructions, data structures, program modules, or other data. Communication media may embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention of a new and useful DIMMABLE LED DRIVER BASED ON PARALLEL RESONANT CURRENT FED SELF-OSCILLATING TOPOLOGY it is not intended that such references be construed as limitations upon the scope of this invention except as set forth in the following claims.

What is claimed is:

1. A driver circuit configured to provide power to a load from a direct current (DC) power rail, the driver circuit comprising:
   a self-oscillating inductor-inductor-capacitor (LLC) series resonant inverter configured to connect to the DC power rail, receive DC power from the DC power rail, and provide an alternating current (AC) output signal;
   a current limiting circuit coupled to the self-oscillating LLC series resonant inverter, wherein the current limiting circuit is configured to receive the AC output signal from the self-oscillating LLC series resonant inverter and provide an AC current signal as a function of a DC current provided to the load by the driver circuit; and
   a rectifier circuit coupled to the current limiting circuit, wherein the rectifier circuit is configured to receive the AC current signal from the current limiting circuit and provide a DC current to the load;
   a current sensing resistor configured to connect in series with the load and provide to the current limiting circuit a current sensing signal indicative of the DC current provided to the load by the driver circuit;
   wherein the DC power rail has an associated ground, and the self-oscillating LLC series resonant inverter comprises
      a first switch having a first terminal connected to the DC power rail, a second terminal, and a control terminal,
      a second switch having a first terminal connected to the second terminal of the first switch, a second terminal connected to the ground associated with the DC power rail, and a control terminal,
      a resonant capacitor having a first terminal and a second terminal, wherein the first terminal is connected to the ground associated with the DC power rail, and
      a transformer having a primary winding, a first secondary winding, a second secondary winding, and an output secondary winding, wherein
         the primary winding of the transformer is connected between the second terminal of the first switch and the second terminal of the resonant capacitor,
         the first secondary winding is connected between the control terminal of the first switch and the second terminal of the first switch,
         the second secondary winding is connected between the control terminal of the second switch and the second terminal of the second switch, and
         the output secondary winding is configured to provide the AC output signal.

2. The driver circuit of claim 1, wherein the self-oscillating LLC series resonant inverter further comprises:
   a first drive resistor connected in series with the first secondary winding of the transformer between the control terminal of the first switch and the second terminal of the first switch; and
   a second drive resistor connected in series with the second secondary winding of the transformer between the control terminal of the second switch and the second terminal of the second switch.

3. The driver circuit of claim 1, wherein the self-oscillating LLC series resonant inverter further comprises:
   a first diode having a cathode connected to the first terminal of the first switch; and
   a second diode having a cathode and an anode, wherein the cathode is connected to an anode of the first diode and the anode is connected to the ground associated with the DC power rail.

4. The driver circuit of claim 1, wherein the AC output signal has a substantially constant alternating current (AC) voltage.

5. The driver circuit of claim 1, wherein:
   the self-oscillating LLC series resonant inverter comprises a transformer having an output secondary winding, the output secondary winding has a first terminal and a second terminal; and
   the current limiting circuit comprises a current limiting capacitor having a first terminal connected to the first terminal of the output secondary winding of the transformer and a second terminal connected to the rectifier circuit.

6. The driver circuit of claim 1, wherein the driver circuit further comprises a dimming circuit configured to provide a target current signal indicative of a target current, the self-oscillating LLC series resonant inverter comprises a transformer having an output secondary winding, the output secondary winding has a first terminal and a second terminal, and the current limiting circuit comprises
   a current limiting capacitor having a first terminal connected to the first terminal of the output secondary winding of the transformer and a second terminal connected to the rectifier circuit, and
   an output current regulator connected between the second terminal of the current limiting capacitor and the second terminal of the output secondary winding of the transformer, the output current regulator comprising
      a dimming capacitor,
      a bidirectional switch connected in series with the dimming capacitor between the second terminal of the current limiting capacitor and the second terminal of the output secondary winding of the transformer, and
      a controller configured to provide a pulse width modulated signal to the bidirectional switch as a function of the DC current provided to the load by the driver circuit and the target current indicated by the target current signal provided by the dimming circuit.

7. The driver circuit of claim 1, wherein:
   the rectifier circuit comprises a full wave rectifier circuit;
   the driver circuit further comprises an output capacitor connected in parallel with the load; and
   the load includes a light source comprising at least one light emitting diode.

8. A driver circuit configured to provide power to a load from a direct current (DC) power rail, the driver circuit comprising:
   a self-oscillating inductor-inductor-capacitor (LLC) series resonant inverter configured to connect to the DC power rail, receive DC power from the DC power rail, and provide an alternating current (AC) output signal;
   a current limiting circuit coupled to the self-oscillating LLC series resonant inverter, wherein the current limiting circuit is configured to receive the AC output signal from the self-oscillating LLC series resonant inverter and provide an AC current signal as a function of a DC current provided to the load by the driver circuit;
a rectifier circuit coupled to the current limiting circuit, wherein the rectifier circuit is configured to receive the AC current signal from the current limiting circuit and provide a DC current to the load;
wherein the self-oscillating LLC series resonant inverter comprises a transformer having an output secondary winding, the output secondary winding has a first terminal and a second terminal, and the current limiting circuit comprises
a current limiting capacitor having a first terminal connected to the first terminal of the output secondary winding of the transformer and a second terminal connected to the rectifier circuit, and
an output current regulator connected between the second terminal of the current limiting capacitor and the second terminal of the output secondary winding of the transformer, the output current regulator comprising
a dimming capacitor,
a bidirectional switch connected in series with the dimming capacitor between the second terminal of the current limiting capacitor and the second terminal of the output secondary winding of the transformer, and
a controller configured to provide a pulse width modulated signal to the bidirectional switch as a function of the DC current provided to the load by the driver circuit.

9. A light fixture configured to receive power from a power source and provide light, the light fixture comprising:
an input stage configured to receive power from the power source and provide a direct current (DC) power rail, wherein the DC power rail has a substantially constant DC voltage;
a light source configured to provide light in response to receiving power;
a driver circuit configured to provide power to the light source from the DC power rail, the driver circuit comprising
a self-oscillating inductor-inductor-capacitor (LLC) series resonant inverter connected to the DC power rail, wherein the self-oscillating LLC series resonant inverter is configured to receive DC power from the DC power rail, and provide an alternating current (AC) output signal,
a current limiting circuit connected to the self-oscillating LLC series resonant inverter, wherein the current limiting circuit is configured to receive the AC output signal from the self-oscillating LLC series resonant inverter and provide an AC current signal as a function of a DC current provided to the light source by the driver circuit, and
a rectifier circuit connected to the current limiting circuit, wherein the rectifier circuit is configured to receive the AC current signal from the current limiting circuit and provide a DC current to the light source; and
a housing configured to support the input stage, the light source and the driver circuit;
wherein the driver circuit further comprises a current sensing resistor configured to connect in series with the light source and provide to the current limiting circuit a current sensing signal indicative of the DC current provided to the light source by the driver circuit; and
wherein the DC power rail has an associated ground, and the self-oscillating LLC series resonant inverter comprises
a first switch having a first terminal connected to the DC power rail, a second terminal, and a control terminal,
a second switch having a first terminal connected to the second terminal of the first switch, a second terminal connected to the ground associated with the DC power rail, and a control terminal,
a resonant capacitor having a first terminal and a second terminal, wherein the first terminal is connected to the ground associated with the DC power rail, and
a transformer having a primary winding, a first secondary winding, a second secondary winding, and an output secondary winding, wherein
the primary winding of the transformer is connected between the second terminal of the first switch and the second terminal of the resonant capacitor,
the first secondary winding is connected between the control terminal of the first switch and the second terminal of the first switch,
the second secondary winding is connected between the control terminal of the second switch and the second terminal of the second switch, and
the output secondary winding is configured to provide the AC output signal.

10. The light fixture of claim 9, wherein the self-oscillating LLC series resonant inverter further comprises:
a first drive resistor connected in series with the first secondary winding of the transformer between the control terminal of the first switch and the second terminal of the first switch; and
a second drive resistor connected in series with the second secondary winding of the transformer between the control terminal of the second switch and the second terminal of the second switch.

11. The light fixture of claim 9, wherein the self-oscillating LLC series resonant inverter further comprises:
a first diode having a cathode connected to the first terminal of the first switch; and
a second diode having a cathode and an anode, wherein the cathode is connected to an anode of the first diode and the anode is connected to the ground associated with the DC power rail.

12. The light fixture of claim 9, wherein the self oscillating LLC series resonant inverter is configured such that the AC output signal has a substantially constant alternating current (AC) voltage.

13. The light fixture of claim 9, wherein the self-oscillating LLC series resonant inverter comprises a transformer having an output secondary winding, the output secondary winding has a first terminal and a second terminal, and the current limiting circuit comprises a current limiting capacitor having a first terminal connected to the first terminal of the output secondary winding of the transformer and a second terminal connected to the rectifier circuit.

14. The light fixture of claim 9, wherein the self-oscillating LLC series resonant inverter comprises a transformer having an output secondary winding, the output secondary winding has a first terminal and a second terminal, and the current limiting circuit comprises
a current limiting capacitor having a first terminal connected to the first terminal of the output secondary winding of the transformer and a second terminal connected to the rectifier circuit, and an output current regulator connected between the second terminal of the current limiting capacitor and the second terminal of the output secondary winding of the transformer, the output current regulator comprising
a dimming capacitor,
a bidirectional switch connected in series with the dimming capacitor between the second terminal of the current limiting capacitor and the second terminal of the output secondary winding of the transformer, and
a controller configured to provide a pulse width modulated signal to the bidirectional switch as a function of the DC current provided to the light source by the driver circuit.

15. The light fixture of claim 9, wherein the driver circuit further comprises a dimming circuit configured to provide a target current signal indicative of a target current, the self-oscillating LLC series resonant inverter comprises a transformer having an output secondary winding, the output secondary winding has a first terminal and a second terminal, and the current limiting circuit comprises
a current limiting capacitor having a first terminal connected to the first terminal of the output secondary winding of the transformer and a second terminal connected to the rectifier circuit, and
an output current regulator connected between the second terminal of the current limiting capacitor and the second terminal of the output secondary winding of the transformer, the output current regulator comprising
a dimming capacitor,
a bidirectional switch connected in series with the dimming capacitor between the second terminal of the current limiting capacitor and the second terminal of the output secondary winding of the transformer, and
a controller configured to provide a pulse width modulated signal to the bidirectional switch as a function of the DC current provided to the light source by the driver circuit and the target current indicated by the target current signal provided by the dimming circuit.

16. The light fixture of claim 9, wherein:
the rectifier circuit is a full wave rectifier circuit;
the driver circuit further comprises an output capacitor connected in parallel with the light source;
the light source comprises at least one light emitting diode;
the power source is AC line power; and
the input stage is a power factor correcting AC to DC converter.

* * * * *